(12) United States Patent
Janson et al.

(10) Patent No.: US 6,893,568 B1
(45) Date of Patent: May 17, 2005

(54) IMMERSED MEMBRANE FILTRATION SYSTEM AND OVERFLOW PROCESS

(75) Inventors: Arnold Janson, Burlington (CA); Nicholas Adams, Hamilton (CA); Jason Cadera, Guelph (CA); Pierre Cote, Dundas (CA); Steven Pedersen, Burlington (CA)

(73) Assignee: ZENON Environmental Inc., Oakville (CA)

( * ) Notice: Subject to any disclaimer, the term of this patent is extended or adjusted under 35 U.S.C. 154(b) by 0 days.

(21) Appl. No.: 09/565,032

(22) Filed: May 5, 2000

(30) Foreign Application Priority Data

Nov. 18, 1999 (CA) .............................................. 2290053

(51) Int. Cl.[7] .............................................. B01D 61/00
(52) U.S. Cl. ....................... 210/650; 210/636; 210/760; 210/220; 210/321.8; 210/333.01; 210/333.1; 210/321.69
(58) Field of Search ................................. 210/636, 650, 210/760, 220, 321.69, 333.1, 333.01, 321.8; 134/10

(56) References Cited

U.S. PATENT DOCUMENTS

| | | | | |
|---|---|---|---|---|
| 5,248,424 A | * | 9/1993 | Cote et al. | |
| 5,607,593 A | * | 3/1997 | Cote et al. | |
| 5,783,083 A | * | 7/1998 | Henshaw et al. | |
| 5,944,997 A | * | 8/1999 | Pedersen et al. | |
| 5,958,243 A | * | 9/1999 | Lawrence et al. | |
| 6,045,698 A | * | 4/2000 | Cote et al. | |
| 6,156,200 A | * | 12/2000 | Zha et al. | |
| 6,193,890 B1 | * | 2/2001 | Pedersen et al. | |
| 6,214,231 B1 | * | 4/2001 | Cote et al. | |
| 6,325,928 B1 | * | 12/2001 | Pedersen et al. | |
| 6,375,848 B1 | * | 4/2002 | Cote et al. | |

FOREIGN PATENT DOCUMENTS

| | | |
|---|---|---|
| EP | 1 034 835 | 9/2000 |
| JP | 6218237 | 8/1994 |
| JP | 7155758 | 6/1995 |
| JP | 09220569 | * 8/1997 |
| JP | 11-165200 | * 11/1998 |
| WO | WO 98/28066 | 7/1998 |

OTHER PUBLICATIONS

Johnson, Warren T., "Recent Advances in Microfiltration for Drinking Water Treatment", presented at the AWWA Conference in Chicago, Jun. 20–24, 1999.

* cited by examiner

*Primary Examiner*—Ana M. Fortuna
(74) *Attorney, Agent, or Firm*—Bereskin & Parr

(57) ABSTRACT

Modules of ultrafiltration or microfiltration membranes are arranged in a tank open to the atmosphere to substantially cover the cross sectional area of the tank. A filtration cycle has permeation steps and deconcentration steps. During permeation, supply of feed substantially equals feed removed and little if any aeration is used During deconcentration, aeration with scouring bubbles is provided with one or both of backwashing and feed flushing. In feed flushing, feed water is supplied to the tank from below the modules. Excess tank water created during deconcentration flows generally upwards through the modules and out through a retentate outlet or overflow at the top of the tank.

11 Claims, 4 Drawing Sheets

IMMERSED MEMBRANE FILTRATION SYSTEM AND OVERFLOW PROCESS

This application claims a right of priority in of Canadian Patent Application No. 2,290,053 filed Nov. 18, 1999.

FIELD OF THE INVENTION

This invention relates to a filtration system using immersed suction driven filtering membranes to filter water, for example, to filter surface water to produce potable water, and to a method of operating such a system.

BACKGROUND OF THE INVENTION

A prior art immersed membrane water filtration system is shown in FIG. 1. An open tank (a) holds a membrane module (b) immersed in tank water (c). Feed water to be filtered flows into the tank, typically continuously. Suction on an inner surface of the membranes in the membrane module (b) draws filtered permeate through the membrane wall. Solids are rejected by the membranes and accumulate in the tank water (c). Solids rich retentate is continuously or periodically drained from the tank.

The membrane module (b) is cleaned in part by backwashing and aeration. In backwashing, a backwashing liquid (typically permeate or permeate with a chemical additive) is pumped into the inner spaces of the membranes and flows into the tank water (c). In aeration, air bubbles are created at an aerator (d) mounted below the membrane module (c). The air bubbles agitate and scour the membranes and create an air lift effect. The air lift effect moves tank water (c) in a recirculation pattern (e) upwards through the membrane module (b) and in a downcomer (f) through spaces between the perimeter of the module (b) and the sides of the tank (a). The tank water (c) flowing in the recirculation pattern (e) further physically cleans the membranes and disperses solids rich water from near the membrane module (b).

SUMMARY OF THE INVENTION

It is an object of the present invention to improve on the prior art. This object is met by the combination of features, steps or both found in the independent claims, the dependent claims disclosing further advantageous embodiments of the invention. The following summary may not describe all necessary features of the invention which may reside in a sub-combination of the following features or in a combination with features described in other parts of this document.

In various aspects of the invention, a filtration system having immersed suction driven filtering membranes is used to filter water containing low concentrations of suspended solids, for example, to filter surface water to produce potable water. A process is provided for operating such a system.

Membrane modules are arranged in a tank open to the atmosphere and fill most of its horizontal cross sectional area. An upper portion of the tank encloses a volume directly above the modules. This upper portion of the tank is provided with a retentate outlet from the tank. Tank water that is not withdrawn as permeate flows out of the tank through the retentate outlet.

Permeate is withdrawn by suction on an inner surface of the membranes, preferably at a flux between 10 and 60 $L/m^2/h$, more preferably between 20 and 40 $L/m^2/h$. Feed water is added to the tank at a rate that substantially equals the rate at which permeate is withdrawn. Thus during permeation little if any tank water flows out of the outlet and the level of the tank water remains above the membranes.

Permeation is stopped periodically for a deconcentration step. During the deconcentration step the membranes are backwashed, feed flow is provided from below the modules or both. Tank water rises through the modules, the water level in the tank rises and tank water containing solids (then called retentate) flows out of the retentate outlet to deconcentrate the tank water. Aeration with scouring bubbles is provided during the deconcentration step.

DETAILED DESCRIPTION OF EMBODIMENTS

Figure 1:
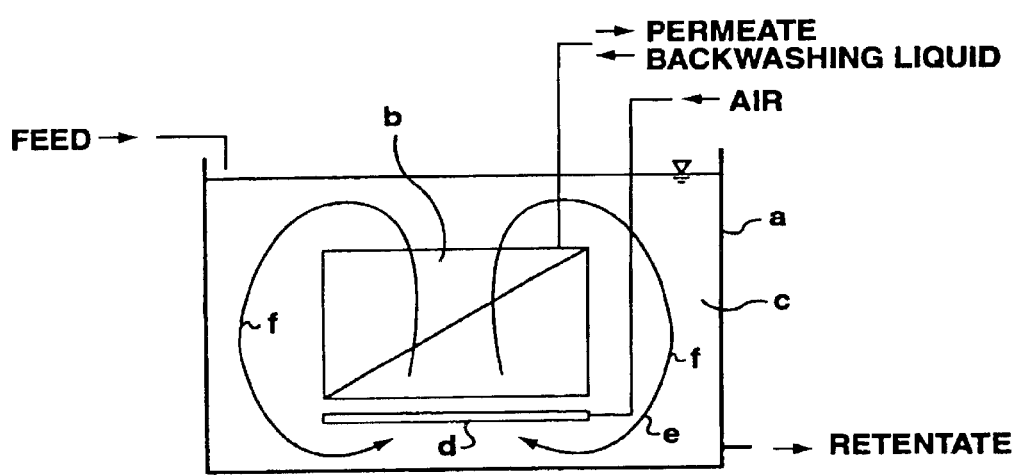
FIG. 1 is a schematic representation of a prior art filtration system.
Figure 2:
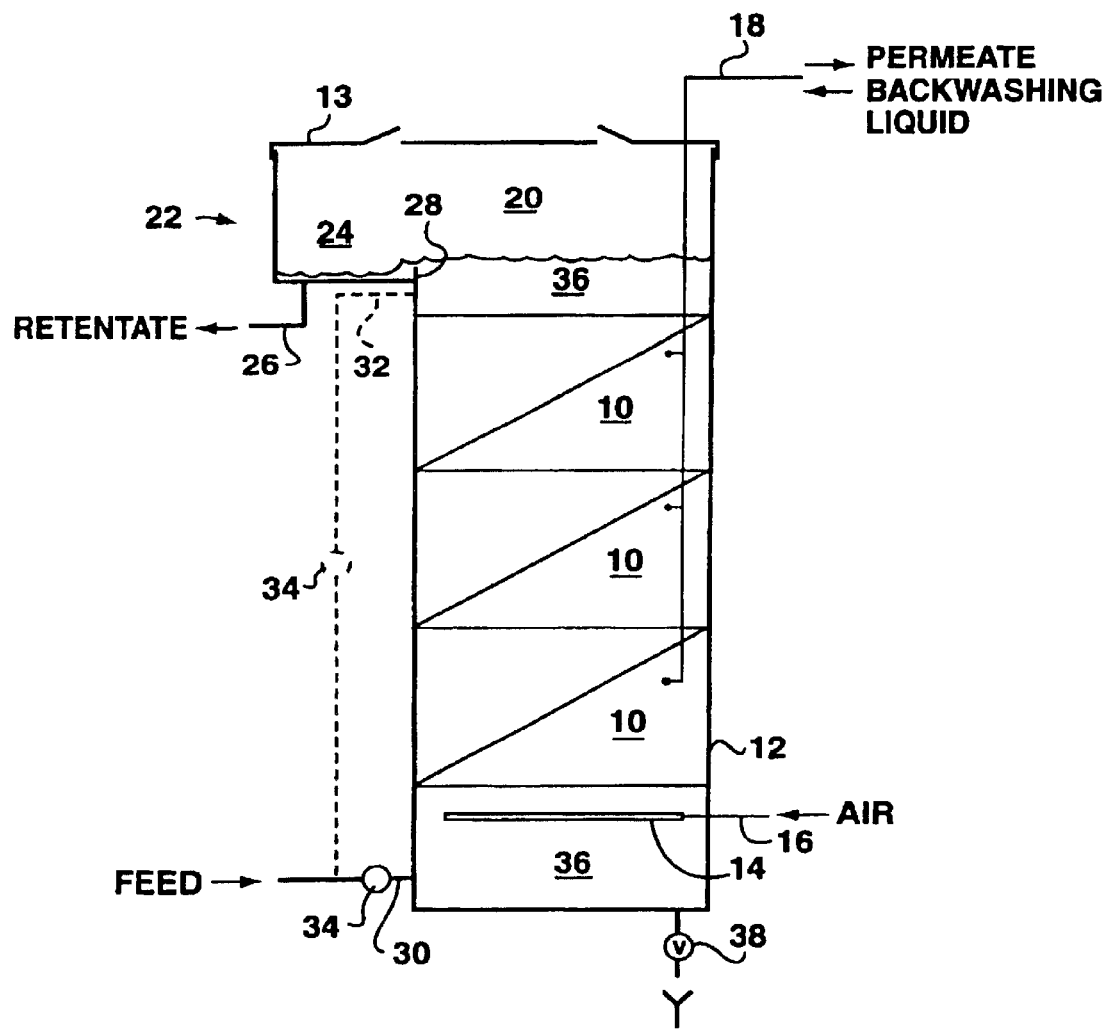
FIG. 2 is a schematic representation of a filtering reactor made in accordance with a preferred embodiment of the present invention.

Referring to FIG. 2, three membrane modules 10 are stacked on top of each other in a tank 12. The tank 12 is open to the atmosphere although it may be covered with a vented lid 13. The membrane modules 10 may contain flat sheet or hollow fibre membranes with pore sizes in the microfiltration or ultrafiltration range, preferably between 0.003 and 10 microns and more preferably between 0.01 and 1.0 microns. An inner surface of the membranes is connected to one or more headers. An aerator 14 is mounted below the membrane modules 10. The aerator 14 is connected to an air supply pipe 14 in turn connected to a supply of air, nitrogen or other suitable gas.

Preferably, the membrane modules 10 contain hollow fibre membranes oriented horizontally and mounted in a slightly slackened state between pairs of horizontally spaced, vertically extending headers. U.S. patent application Ser. No. 09/505,718 filed Feb. 17, 2000 now U.S. Pat. 6,325,928 and assigned to ZENON Environmental Inc. describes an example of a suitable membrane module and aerator and is incorporated herein by this reference. Such modules can provide 500 to 1500 $m^2$ of membrane surface area for each $m^2$ of horizontal cross-sectional area, of a large municipal or commercial tank and there is minimal channeling or dead zones when tank water flows through the modules.

Figure 4:
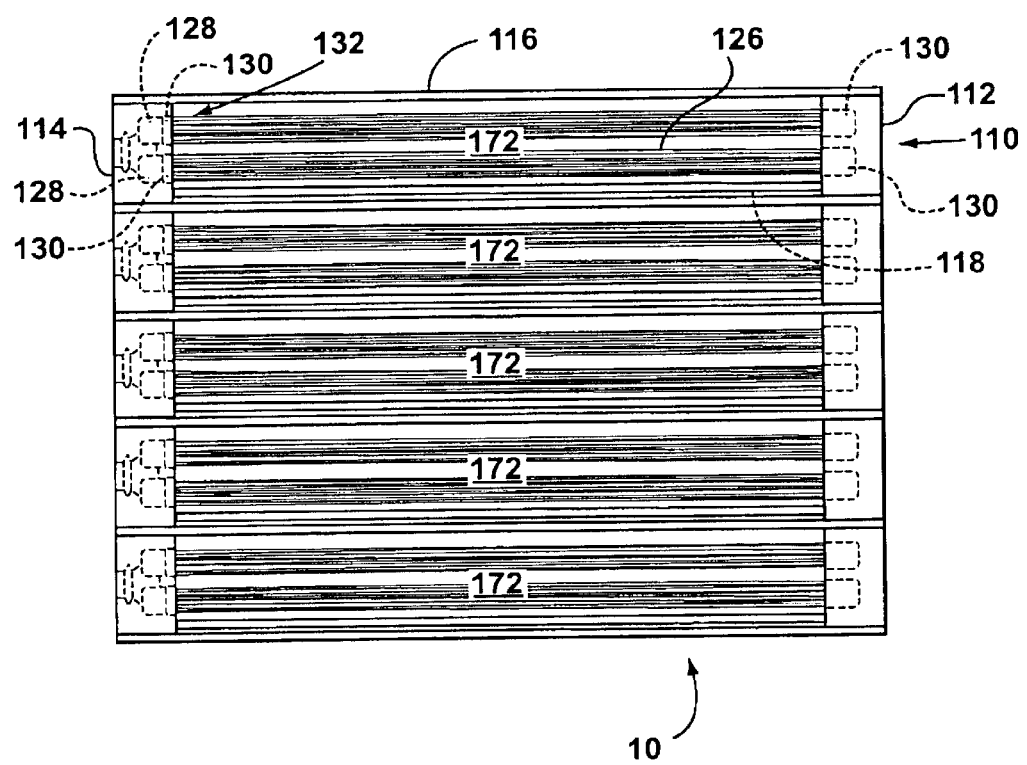
FIG. 4 shows a plant view of the module of FIG. 1.

Referring now to FIG. 4, a plan view of a module 10 is shown. The module 10 has a plurality of elements 110 placed side by side in a row. Each element 110 has a vertically extending closed header 112 and a vertically extending open header 114 held in an opposed horizontally spaced relationship by one or more side plates 116 or struts 118 extending between the closed header 112 and open header 114. The last element 110 in the row has two side plates 116. For other elements, a single plate 116 between two elements 110 serves both such elements 110. Side plates 116, open headers 112 and closed headers 114 define vertical flow channels 172 through elements 110.

A plurality of hollow fiber membranes 126 are attached to and suspended between the closed header 112 and the open header 114. The membranes 126 have at least one open end 132 each. The open ends 132 of the membranes 126 are held in a closely spaced apart relationship in a plug of potting resin 130 which encloses one or more permeate channels 128 of the open header 114. The resin 130 surrounds each open end 132 of the membrane 126 so that water cannot enter the permeate channels 128 other than by passing through the walls of the membranes 126. The interior of the membranes 126 is in fluid communication with the one or more permeate channels 128 so that permeate withdrawn through the membranes 126 can be collected in the one or more permeate channels 128.

The membrane modules 10 are sized and positioned to fill most of the horizontal cross-sectional area of the tank 12 leaving room only for necessary fittings and other apparatus and maintenance or set-up procedures. Space is not provided for downcomers outside the perimeter of the modules 10 and baffles are provided if necessary to block flow through any space left for fittings etc. or otherwise outside the perimeter of the membrane modules 10. Preferably more than 90%, more preferably substantially all, of the horizontal cross-sectional area of the tank 12 is filled with modules 56.

A permeate pipe 18 connects the headers of the membrane modules to means for permeating by suction on the inner surfaces of the membranes and backwashing means. Such means are known in the art and allow the permeate pipe 18 to be used to either withdraw permeate from the tank 12 or to flow a backwashing liquid (typically permeate or permeate mixed with a chemical) in a reverse direction through the membranes and into the tank 12 in which the backwashing liquid becomes part of tank water 36.

An upper portion 20 of the tank 12 is provided with a retentate outlet 22 having an overflow area 24 connected to a drain pipe 26 to remove retentate from the tank 12. Retentate outlet 22 preferably incorporates an overflow or weir 28 which helps foam produced by aeration (otherwise a cleanliness, safety or volatile chemical release problem) to flow into the overflow area 24. The retentate outlet 22 preferably also has sufficient capacity to release expected flows of retentate quickly to reduce the required free board of the tank 12.

Feed water enters the tank 12 through a first inlet 30 or a second inlet 32 as determined by feed valves 34. Once in the tank 12, feed water may be called tank water 36 which flows generally upwards or downwards through the membrane modules 10.

A filtration cycle has a permeation step followed by a deconcentration step and is repeated many times between more intensive maintenance or recovery cleaning procedures. The permeation step typically lasts for about 15 to 60 minutes, preferably 20 to 40 minutes and is carried out in the absence of aeration. Permeate flux is preferably between 10 and 60 L/m$^2$/h, more preferably between 20 and 40 L/m$^2$/h, wherein the surface area of hollow fibre membranes is based on the outside diameter of the membranes.

During permeation, feed water is added to the tank 12 from one of the inlets 30, 32 at substantially the rate at which permeate is withdrawn. Tank water 36 flows through the membrane modules 10 to generally replace permeate as it is withdrawn from the tank 12. Thus during permeation little if any tank water 36 flows out of the retentate outlet 22 and the level of the tank water 36 remains above the membranes. If the membrane module acts to some extent like a media filter (such as the modules in U.S. patent application Ser. No. 09/505,718 referred to above), feed preferably enters the tank 12 through the second inlet 32. In this way, solids in some feed waters are preferentially deposited in the upper membrane module 10, closer to the retentate outlet 22 and where the upward velocity of the tank water 36 during a deconcentration step will be the greatest, as will be explained below. This set-up is also useful in retrofitting sand filters which are typically set up to receive feed from the top and to backwash from below. For other membrane modules 10, installations or feed waters, the first inlet 30 may be used during permeation.

The deconcentration step commences when permeation stops and lasts for about 20 to 90 seconds, preferably 30 to 60 seconds. During the deconcentration step, scouring bubbles are produced at the aerator 14 and rise through the membrane modules 10. In addition one or both of the steps of backwashing and feed flushing are performed. To flush with feed water, feed enters the tank 12 through the first inlet 30 creating an excess of tank water 36 which rises upwards through the membrane modules 10. The rate of flow of feed water during feed flushing is typically between 0.5 and 2, preferably between 0.7 and 1.5, times the rate of flow of feed water during permeation. With either backwashing or feed flushing, the level of the tank water 36 rises, tank water 36 flows upwards through the membrane modules 10 and tank water 36 containing solids (then called retentate) flows out of the retentate outlet 22 to deconcentrate the tank water 36.

In some cases, the upwards velocity of the tank water 36 may create forces on the membranes that exceed their strength; particularly if strong feed flushing and back washing are performed simultaneously. In these cases, the rate of flow of feed water or backwash liquid or both can be reduced to reduce the upward velocity of the tank water 36. Alternatively, the flow of feed water can be turned off during backwashing and any feed flushing done while there is no backwashing and vice versa. For example, a deconcentration step may involve backwashing preferably with aeration but without feed flushing for a first part of the deconcentration step and feed flushing preferably with aeration but without backwashing for a second part of the deconcentration step. Further alternatively, deconcentration steps involving backwashing preferably with aeration but without feed flushing can be performed in some cycles and deconcentration steps involving feed flushing preferably with aeration but without backwashing can be used in other cycles. Other combinations of the above procedures might also be used.

Aeration is typically performed at the same time as the other steps to reduce the total time of the deconcentration step. Aeration may, however, begin several seconds (approximately the time required for a bubble to rise from the aerator 14 to the surface of the tank water 36) before backwashing or feed flushing. Such aeration in the absence of tank water 36 flow because no space was left for downcomers) causes turbulence which help loosen some foulants and float some solids to near the top of the tank 12 before retentate starts flowing out the retentate outlet 20.

Aeration during the deconcentration step does not need to overcome suction to dislodge solids from the membranes and is provided at a superficial velocity (m$^3$/h of air at standard conditions per m$^2$ of module cross-sectional area) between 25 m/h and 75 m/h. For many if not most feed waters, particularly those feed waters having low turbidity and solids concentrations less than about 500 mg/L, additional aeration is not required. Nevertheless, a smaller amount of aeration may be provided with difficult feed water during permeation to disperse solids from dead zones in a membrane module 10 and homogenize the tank water 36. For this purpose, aeration is provided at a superficial velocity less than 25 m/h or intermittently at the higher rates described above.

During the deconcentration step, the feed water or backwashing liquid introduced into the tank 12 creates a flow of tank water 36 upwards through the modules 10. The tank water 36 flowing through the membrane modules 10 helps remove solids loosened by the scouring bubbles from the membrane modules 10 and also directly acts on the surface of the membranes. The tank water 36 flows most rapidly near the top of the tank 12 which helps reduce preferential fouling of upper membranes when membrane modules 10 are stacked, for example to depths of 2 m or more. Some solids in the tank water 36 may have a settling velocity greater than the velocity of the upflow velocity and will settle. The volume of these solids is small and they may be removed from time to time by partially draining the tank 12 through a supplemental drain 38.

Based on a design permeate flux, the required flow of feed water during permeation can be calculated and delivered, typically by adjusting a feed pump or feed valve. The frequency and intensity of deconcentration events is then selected to achieve a desired loss in membrane permeability over time. If flux during permeation is kept below about 60 $L/m^2/h$, preferably less than 40 $L/m^2/h$, the inventors have found that surprising little fouling occurs and the periodic deconcentration events are usually sufficient. More surprisingly, the energy cost savings produced by operating at low flux and low aeration more than offsets the cost of filling the tank 12 with membrane modules 10. Despite the low flux (compared to a more typical flux of 50 to 100 $L/m^2/h$), high tank velocities (flux of permeate in $m^3/h$ divided by tank horizontal cross sectional area in $m^2$) are achieved which compare favourably with sand filtration. Further, resulting recovery rates are generally adequate for single stage filtration and are typically adequate for the first stage of two stage filtration (wherein the retentate is refiltered) even with aggressive deconcentration.

Figure 3:
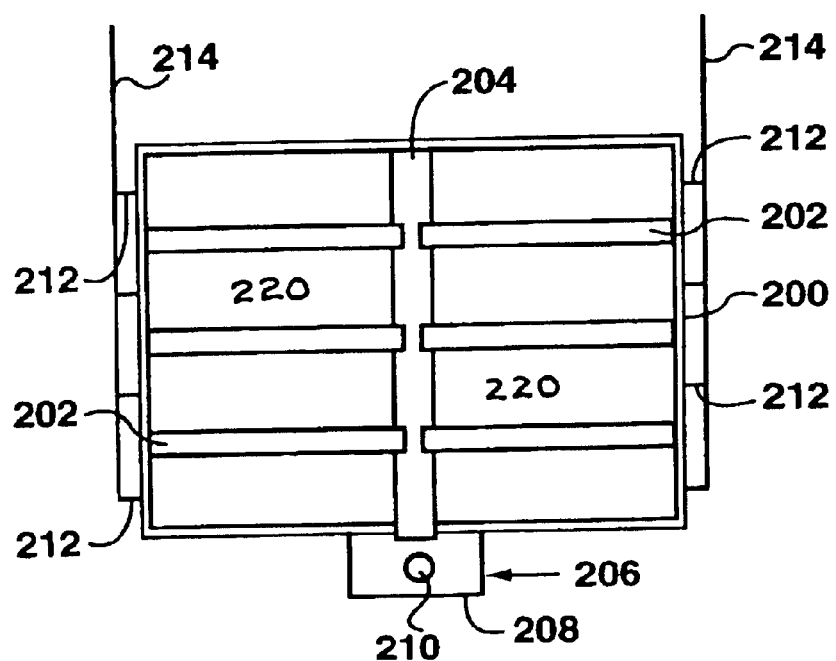
FIG. 3 is a plan view of a filtering reactor made in accordance with a preferred embodiment of the present invention.

FIG. 3 shows a plan view of a larger filtering reactor. A tank 200 encloses several cassettes 220 each of which may contain a plurality of membrane modules. Open channels 202 are provided between adjacent cassettes 220 to receive tank water overflowing the cassettes 210 as described above. The channels 202 are sloped to drain towards a large trough 204, which is in turn sloped to drain towards a second outlet 206. The second outlet 206 has an outlet box 208 to temporarily hold the discharged tank water before it flows into a drain pipe 210. As in the embodiment of FIG. 2, feed water enters the tank 200 at a point below the cassettes 220, but several second inlets 212 are attached to an inlet header 214 to provide a distributed supply of feed.

It is to be understood that what has been described are preferred embodiments of the invention for example and without limitation to the combination of features necessary for carrying the invention into effect. The invention may be susceptible to certain changes and alternative embodiments without departing from the subject invention, the scope of which is defined in the following claims.

We claim:

1. A process of filtering water comprising the steps of,
   (a) providing one or more modules of filtering membranes immersed in water in a tank open to the atmosphere;
   (b) providing a retentate outlet from an upper portion of the tank enclosing a volume of water directly above the one or more modules; and,
   (c) in repeated cycles,
      (i) permeating filtered water by (i) adding a selected volume of feed water to the tank, in addition to water already in the tank, and (ii) withdrawing a volume of water through the one or more modules as permeate, the volume of the permeate being substantially the same as the selected volume; and,
      (ii) after step (i), performing a deconcentration step further comprising the steps of, (A) stopping permeation; (B) providing scouring bubbles from below the modules; (c) at least one of (I) backwashing or (II) providing a flow of feed water into the tank from below the modules or both (I) and (II); and, (D) flowing excess water containing retained solids upwards through the modules and out of the retentate outlet.

2. The process of claim 1 wherein any space between the perimeter of the modules and the tank is blocked to prevent flow through such space.

3. The process of claim 1 wherein the modules cover more than 90% of the horizontal cross sectional area of the tank.

4. The process of any of claims 2 or 3 wherein the modules cover substantially all of the horizontal cross sectional area of the tank.

5. The process of claim 4 wherein the filtering membranes are hollow fibres oriented horizontally.

6. The process of any of claims 1, 2 or 3 wherein the membranes are backwashed as part of step (c)(ii)(C) of claim 1 and step (c)(ii)(B) of claim 1 is commenced before the membranes are backwashed.

7. The process of any of claims 2 or 3 wherein the filtering membranes are hollow fibres oriented horizontally.

8. The process of claim 1 wherein feed water is provided from above the modules during permeation.

9. A process of filtering water comprising:
   (A) providing one or more modules of filtering membrane immersed in water open to the atmosphere in a tank having an outlet above the one or more modules;
   (B) providing a plurality of enclosed vertically oriented channels within the one or more modules for water to flow from below the filtering membranes to the outlet;
   (c) repeating a filtration cycle further comprising the steps of,
   (a) flowing feed water into the one or more channels,
   (b) withdrawing permeate by suction on an inner surface of the filtering membranes;
   (c) providing scouring bubbles which rise through the modules; and,
   (d) backwashing the membranes,
   wherein water not withdrawn as permeate flows upwards through the modules and exits through the outlet.

10. The process of claim 9 wherein the filtering membranes are hollow fibres oriented horizontally.

11. The process of claim 9 wherein feed water is provided from above the modules during permeation.

* * * * *